(12) United States Patent (10) Patent No.: US 12,651,976 B2

Toyoda (45) Date of Patent: Jun. 9, 2026

(54) POWER CONVERSION DEVICE FOR SUPPRESSING POWER LOSS

(71) Applicant: TOYOTA JIDOSHA KABUSHIKI KAISHA, Toyota (JP)

(72) Inventor: Hiroaki Toyoda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/750,018

(22) Filed: Jun. 21, 2024

(65) Prior Publication Data

US 2025/0132659 A1 Apr. 24, 2025

(30) Foreign Application Priority Data

Oct. 18, 2023 (JP) .................................. 2023-179570

(51) Int. Cl.
| | |
|---|---|
| *H02M 7/5387* | (2007.01) |
| *H02M 1/00* | (2006.01) |
| *H02M 1/084* | (2006.01) |
| *H02M 7/493* | (2007.01) |

(52) U.S. Cl.
CPC ....... *H02M 7/5387* (2013.01); *H02M 1/0054* (2021.05); *H02M 1/084* (2013.01); *H02M 7/493* (2013.01); *H02M 7/53871* (2013.01)

(58) Field of Classification Search
CPC .............. H02M 1/0054; H02M 1/084; H02M 7/53871; H02M 7/5387; H02M 1/0003; H02M 1/322; H02M 1/38; H02P 27/06; H02P 25/18; H02P 25/022; H02P 29/60
See application file for complete search history.

(56) References Cited

U.S. PATENT DOCUMENTS

| | | | | |
|---|---|---|---|---|
| 8,344,677 B2 * | 1/2013 | Takizawa | ................ | H02M 1/32 |
| | | | | 318/500 |
| 10,291,110 B2 * | 5/2019 | Watanabe | ........ | H03K 17/04123 |
| 2006/0108957 A1 * | 5/2006 | Urakabe | ................ | H02P 27/06 |
| | | | | 318/400.28 |
| 2006/0164028 A1 * | 7/2006 | Welchko | ................ | H02P 27/06 |
| | | | | 318/105 |
| 2017/0234285 A1 * | 8/2017 | Huh | ...................... | H02J 7/1423 |
| | | | | 123/179.4 |
| 2017/0310318 A1 * | 10/2017 | Kamiya | ........... | H03K 17/08142 |
| 2018/0278144 A1 * | 9/2018 | Nakano | ................... | H02M 1/32 |
| 2019/0296663 A1 * | 9/2019 | Oka | .................... | H02P 21/0003 |

(Continued)

FOREIGN PATENT DOCUMENTS

| | | |
|---|---|---|
| JP | 2018-014829 A | 1/2018 |
| WO | 2021/166164 A1 | 8/2021 |

*Primary Examiner* — Yusef A Ahmed
(74) *Attorney, Agent, or Firm* — SoraIP, Inc.

(57) ABSTRACT

The three switching devices of the upper arm and the lower arm of the three switching devices of the lower arm of the first inverter and the three switching devices of the upper arm of the second inverter and the switching device for line-connecting are constituted by a first semiconductor switching device, the three switching devices of the lower arm of the second inverter is constituted by a second semiconductor switching device different from the first semiconductor switching device, a semiconductor switching device which is superior in conduction characteristics compared to the second semiconductor switching device as the first semiconductor switching device is used.

4 Claims, 3 Drawing Sheets

(56) References Cited

U.S. PATENT DOCUMENTS

| | | | | |
|---|---|---|---|---|
| 2019/0296677 A1* | 9/2019 | Oka | ......................... | H02P 21/18 |
| 2019/0296678 A1* | 9/2019 | Omata | .................... | H02P 29/50 |
| 2019/0386599 A1* | 12/2019 | Takahashi | ............... | H02P 7/291 |
| 2020/0059190 A1* | 2/2020 | Kim | .................... | H02M 7/5395 |
| 2020/0106287 A1* | 4/2020 | Niimi | ..................... | B60L 53/11 |
| 2020/0144954 A1* | 5/2020 | Kim | ..................... | H02M 7/493 |
| 2020/0185953 A1* | 6/2020 | Shimizu | .................... | H02J 7/50 |
| 2020/0195166 A1* | 6/2020 | Horiuchi | ................. | B62D 6/00 |
| 2020/0244206 A1* | 7/2020 | Ohashi | ..................... | B62D 6/00 |
| 2020/0274461 A1* | 8/2020 | Koikegami | ....... | H02M 7/53875 |
| 2021/0211084 A1* | 7/2021 | Kinjo | ..................... | H02P 27/08 |
| 2021/0234491 A1* | 7/2021 | Takahashi | ............... | H02P 27/06 |
| 2021/0257947 A1* | 8/2021 | Kinjo | .................... | H02M 7/493 |
| 2021/0257953 A1* | 8/2021 | Kashiwazaki | .......... | H02P 27/06 |
| 2021/0265937 A1* | 8/2021 | Kashiwazaki | ...... | H02M 1/0054 |
| 2021/0297006 A1* | 9/2021 | Takahashi | ............. | H02M 7/537 |
| 2022/0077807 A1* | 3/2022 | Jeong | ...................... | H02P 21/22 |
| 2022/0144114 A1* | 5/2022 | Bin | ......................... | B60L 3/003 |
| 2022/0385211 A1* | 12/2022 | Jang | ......................... | H02P 27/06 |
| 2023/0023016 A1* | 1/2023 | Lee | ......................... | H02P 27/08 |
| 2023/0115925 A1* | 4/2023 | Lim | ......................... | H02P 27/14 |
| | | | | 310/68 R |
| 2023/0170830 A1* | 6/2023 | Lee | ......................... | H02P 21/22 |
| | | | | 318/811 |
| 2023/0208337 A1* | 6/2023 | Yamamoto | ............. | H02P 25/22 |
| | | | | 318/496 |
| 2023/0253907 A1* | 8/2023 | Park | ...................... | H02P 25/18 |
| | | | | 318/811 |
| 2023/0268862 A1* | 8/2023 | Lian | .................... | H02M 7/5387 |
| | | | | 307/10.1 |
| 2024/0424930 A1* | 12/2024 | Lee | ......................... | B60L 58/20 |
| 2025/0266781 A1* | 8/2025 | Fujiwara | ................ | H02P 27/06 |
| 2025/0266782 A1* | 8/2025 | Fujimoto | ............... | H02P 27/06 |
| 2025/0364939 A1* | 11/2025 | Jang | ................... | H02P 29/0243 |

* cited by examiner

POWER CONVERSION DEVICE FOR SUPPRESSING POWER LOSS

CROSS-REFERENCE TO RELATED APPLICATION

This application claims priority to Japanese Patent Application No. 2023-179570 filed on Oct. 18, 2023, incorporated herein by reference in its entirety.

BACKGROUND

1. Technical Field

The present disclosure relates to a power conversion device, and more particularly to a power conversion device having two inverters that drive an open winding motor.

2. Description of Related Art

Conventionally, as a power conversion device of this type, there has been proposed an arrangement including a first inverter that is connected to a power line connected to a battery and that is also connected to each phase of an open winding motor, a second inverter that is connected to the power line and that is also connected to each phase of the open winding motor, and two switches attached to a positive side and a negative side of the power line between the first inverter and the second inverter (e.g., see Japanese Unexamined Patent Application Publication No. 2018-014829 (JP 2018-014829)). The power conversion device switches between star connection driving in which star control is performed in a state in which two switches are open, and delta connection driving in which delta control is performed in a state in which two switches are closed.

SUMMARY

However, in the above-described power conversion device, the switches and an upper arm or a lower arm of the switch or the second inverter are constantly in an on state at the time of star connection driving. Accordingly, trouble occurs such as power loss due to electrical resistance due to switching devices in a constantly on state, overheating of the switching devices, and so forth.

A main object of the power conversion device according to the present disclosure is to suppress power loss when performing star connection driving of the open winding motor.

The power conversion device according to the present disclosure employs the following means in order to achieve the above-described main object.

A power conversion device according to the present disclosure is a power conversion device connected to a power storage device and an open winding motor with three phases, the power conversion device including a first inverter that is connected to a power line connected to the power storage device, and that is also connected to the phases of the open winding motor, a second inverter that is connected to the power line and that is also connected to the phases of the open winding motor, and a line-connecting switching device that is attached to a positive side line of the power line, between the first inverter and the second inverter.

Three switching devices of an upper arm and three switching devices of a lower arm of the first inverter, three switching devices of an upper arm of the second inverter, and the line-connecting switching device, are made up of a first semiconductor switching device.

Three switching devices of a lower arm of the second inverter are made up of a second semiconductor switching device that is different from the first semiconductor switching device.

A semiconductor switching device that has higher conduction characteristics as compared to the second semiconductor switching device is used as the first semiconductor switching device.

The power conversion device according to the present disclosure includes the first inverter connected to the power line connected to the power storage device and also connected to each phase of the open winding motor, the second inverter connected to the power line and also connected to each phase of the open winding motor, and the line-connecting switching device attached to the positive side line of the power line between the first inverter and the second inverter. The three switching devices of the upper arm and the three switching devices of the lower arm of the first inverter, the three switching devices of the upper arm of the second inverter, and the line-connecting switching device, are made up of the first semiconductor switching device. The three switching devices of the lower arm of the second inverter are made up of the second semiconductor switching device that is different from the first semiconductor switching device. A semiconductor switching device that has higher conduction characteristics as compared to the second semiconductor switching device is used as the first semiconductor switching device. To perform star connection driving of the open winding motor by performing switching control of the switching devices of the first inverter in a state in which the line-connecting switching device is off, and also the three switching devices of the upper arm of the second inverter are on and the three switching devices of the lower arm of the second inverter are off, the first semiconductor switching device that has high conduction characteristics is used as the three switching devices of the upper arm of the second inverter. Thus, power loss can be suppressed as compared with when the second semiconductor switching device is used as the three switching devices of the upper arm of the second inverter. Further, to perform delta connection driving of the open winding motor by performing switching control of the switching devices of the first inverter, and also performing switching control of the switching devices of the second inverter, in a state in which the line-connecting switching device is on, the first semiconductor switching device that has high conduction characteristics is used as the line-connecting switching device. Thus, power loss can be suppressed as compared with when the second semiconductor switching device is used as the line-connecting switching device. Note that the second semiconductor switching device is generally less expensive as compared to the first semiconductor switching device that has high conduction characteristics. Accordingly, making up the three switching devices of the lower arm of the second inverter with the second semiconductor switching device enables the power conversion device to be made inexpensively, as compared to an arrangement in which the three switching devices of the lower arm of the second inverter are also made up of the first semiconductor switching device.

Also, a power conversion device according to the present disclosure is a power conversion device connected to a power storage device and an open winding motor with three phases, the power conversion device including a first inverter that is connected to a power line connected to the power storage device, and that is also connected to the phases of the open winding motor, a second inverter that is connected to the power line and that is also connected to the phases of the open winding motor, and a line-connecting switching device that is attached to a negative side line of the power line, between the first inverter and the second inverter.

Three switching devices of an upper arm and three switching devices of a lower arm of the first inverter, three switching devices of a lower arm of the second inverter, and the line-connecting switching device, are made up of a first semiconductor switching device.

Three switching devices of an upper arm of the second inverter are made up of a second semiconductor switching device that is different from the first semiconductor switching device.

A semiconductor switching device that has higher conduction characteristics as compared to the second semiconductor switching device is used as the first semiconductor switching device.

Also, the power conversion device according to the present disclosure includes the first inverter connected to the power line connected to the power storage device and also connected to each phase of the open winding motor, the second inverter connected to the power line and also connected to each phase of the open winding motor, and the line-connecting switching device attached to the positive side line of the power line between the first inverter and the second inverter. The three switching devices of the upper arm and the three switching devices of the lower arm of the first inverter, the three switching devices of the lower arm of the second inverter, and the line-connecting switching device, are made up of the first semiconductor switching device. The three switching devices of the upper arm of the second inverter are made up of the second semiconductor switching device that is different from the first semiconductor switching device. A semiconductor switching device that has higher conduction characteristics as compared to the second semiconductor switching device is used as the first semiconductor switching device. To perform star connection driving of the open winding motor by performing switching control of the switching devices of the first inverter in a state in which the line-connecting switching device is off, and also the three switching devices of the lower arm of the second inverter are on and the three switching devices of the upper arm of the second inverter are off, the first semiconductor switching device that has high conduction characteristics is used as the three switching devices of the lower arm of the second inverter. Thus, power loss can be suppressed as compared with when the second semiconductor switching device is used as the three switching devices of the lower arm of the second inverter. Further, to perform delta connection driving of the open winding motor by performing switching control of the switching devices of the first inverter, and also performing switching control of the switching devices of the second inverter, in a state in which the line-connecting switching device is on, the first semiconductor switching device that has high conduction characteristics is used as the line-connecting switching device. Thus, power loss can be suppressed as compared with when the second semiconductor switching device is used as the line-connecting switching device. Note that in this case as well, the second semiconductor switching device is generally less expensive as compared to the first semiconductor switching device that has high conduction characteristics. Accordingly, making up the three switching devices of the lower arm of the second inverter with the second semiconductor switching device enables the power conversion device to be made inexpensively, as compared to an arrangement in which the three switching devices of the lower arm of the second inverter are also made up of the first semiconductor switching device.

In the power conversion device according to the present disclosure, the first semiconductor switching device may be a switching device of a wide bandgap semiconductor using gallium nitride (GaN) or silicon carbide (SiC). The second semiconductor switching device may be a switching device of a semiconductor using silicon (Si). In this case, the first semiconductor switching device may be a SiC metal-oxide-semiconductor field-effect transistor (MOSFET). The second semiconductor switching device may be a Si insulated-gate bipolar transistor (IGBT).

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a configuration diagram illustrating an outline of a configuration of a drive device 20 including a power conversion device 30 according to an embodiment of the present disclosure;

FIG. 2 is an explanatory diagram illustrating an exemplary on-off state of the switching device and a current flow when the open winding motor 40 is driven by the power conversion device 30 in the star connection state; and FIG. 3 is a configuration diagram schematically showing a configuration of a drive device 20B including a power conversion device 30B according to a modification.

DETAILED DESCRIPTION OF EMBODIMENTS

Figure 1:
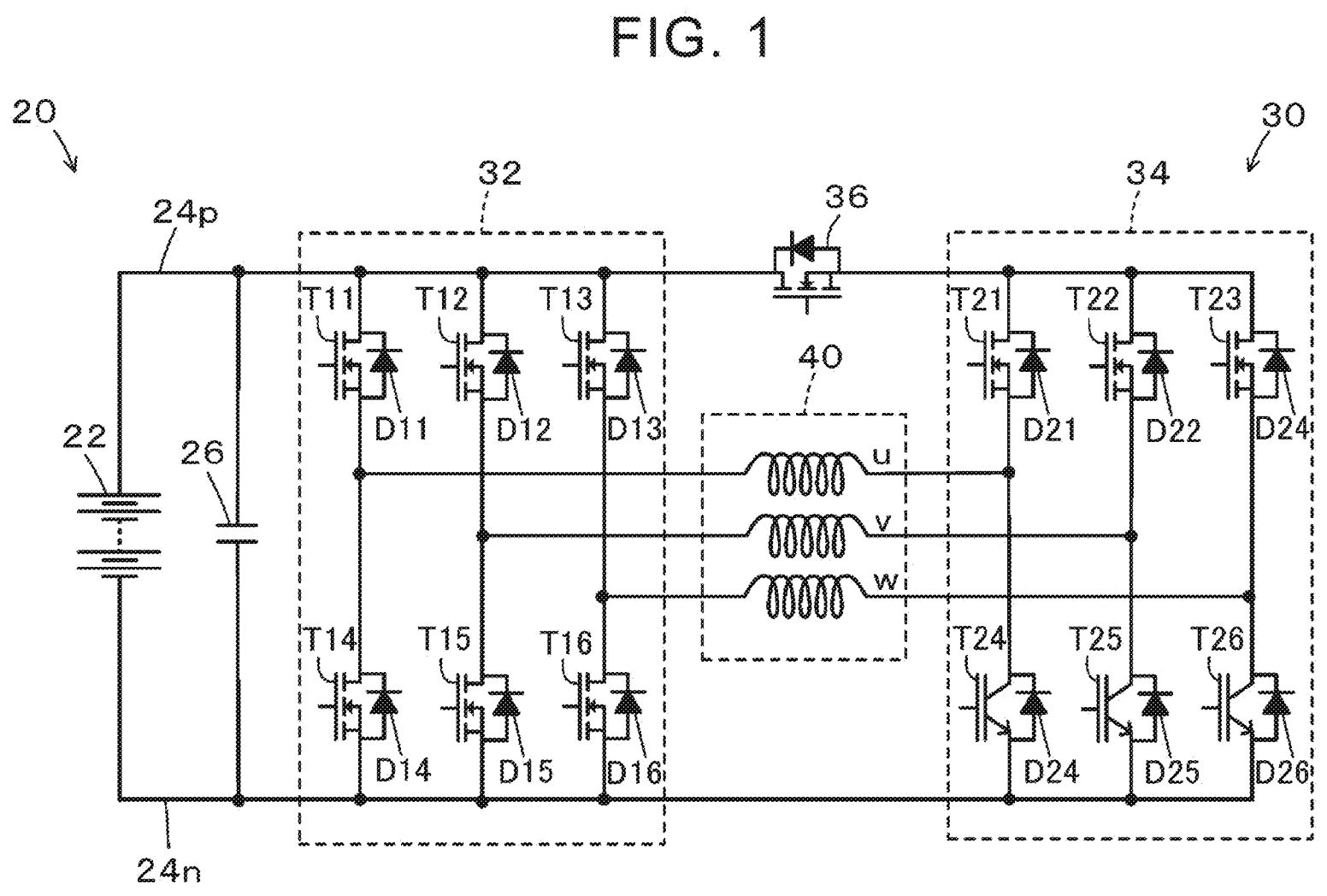

Next, a mode (embodiment) for carrying out the present disclosure will be described. FIG. 1 is a configuration diagram schematically showing a configuration of a drive device 20 including a power conversion device 30 according to an embodiment of the present disclosure. The drive device 20 includes a battery 22, a power conversion device 30, and an open winding motor 40.

The battery 22 is configured as, for example, a lithium-ion secondary battery or a nickel-hydrogen secondary battery, and the positive electrode terminal and the negative electrode terminal are connected to the positive side power line 24p and the negative side power line 24n. A smoothing capacitor 26 is attached to the positive side power line 24p and the negative side power line 24n.

The power conversion device 30 includes a first inverter 32, a second inverter 34, and a connection switch 36.

The first inverter 32 is connected to the positive side power line 24p and the negative side power line 24n to which the battery 22 is connected. The first inverter 32 has transistors T11 to T16 as six switching devices, and six diodes D11 to D16 connected in parallel to each of the six transistors T11 to T16. The transistors T11 to T16 are all SiC-MOSFET (SiC-Metal-Oxide-Semiconductor Field-Effect Transistor). The transistors (the transistor T11 and the transistor T14, the transistor T12 and the transistor T15, the transistor T13 and the transistor T16) which are paired with each other among T16 from the transistor T11 are arranged so as to be source-side and sink-side with respect to the positive-side power line 24p and the negative-side power line 24n. In addition, each of the connecting points of the two transistors that form a pair of the transistors T11 to T16 is connected to one end of a three-phase coil (a coil of the u-phase, the v-phase, and the w-phase) of the open winding motor 40.

The second inverter 34 is connected to the positive-electrode-side power line 24p and the negative-electrode-side power line 24n to which the battery 22 is connected so as to sandwich the first inverter 32 between the second inverter 34 and the battery 22. The second inverter 34 has transistors T21 to T26 as six switching devices, and six diodes D21 to D26 connected in parallel to each of the six transistors T21 to T26. The transistors T21 to T23 constituting the upper arm of the second inverter 34 are configured by SiC-MOSFET in the same manner as the transistors T11 to T16 of the first inverter 32. The transistors T24 to T26 constituting the lower arm of the second inverter 34 are constituted by Si-IGBT (Si-Insulated-Gate Bipolar Transistor). The transistors (the transistor T21 and the transistor T24, the transistor T22 and the transistor T25, the transistor T23 and the transistor T26) which are paired with each other among T26 from the transistor T21 are arranged so as to be source-side and sink-side with respect to the positive-side power line 24p and the negative-side power line 24n. In addition, each of the connecting points of the two transistors that form the pair of the transistors T21 to T26 is connected to the other end of the three-phase coil (the coil of the u-phase, the v-phase, and the w-phase) of the open winding motor 40.

The connection switch 36 is mounted between the first inverter 32 and the second inverter 34 of the positive side power line 24p. The connection switch 36 is constituted by a SiC-MOSFET in the same manner as the transistors T21 to T23 constituting the upper arm of T16 and the second inverter 34 from the transistor T11 of the first inverter 32.

The open winding motor 40 is a generator motor in which both ends of three-phase windings, i.e., u-phase, v-phase, and w-phase, are configured as connection terminals. Three connection points of two transistors that are a pair of the first inverter 32 are connected to one end side of each winding of three phases of the u phase, the v phase, and the w phase. Three connection points of two transistors that are a pair of the second inverters 34 are connected to the other end sides of the three-phase windings of the u-phase, the v-phase, and the w-phase.

Figure 2:
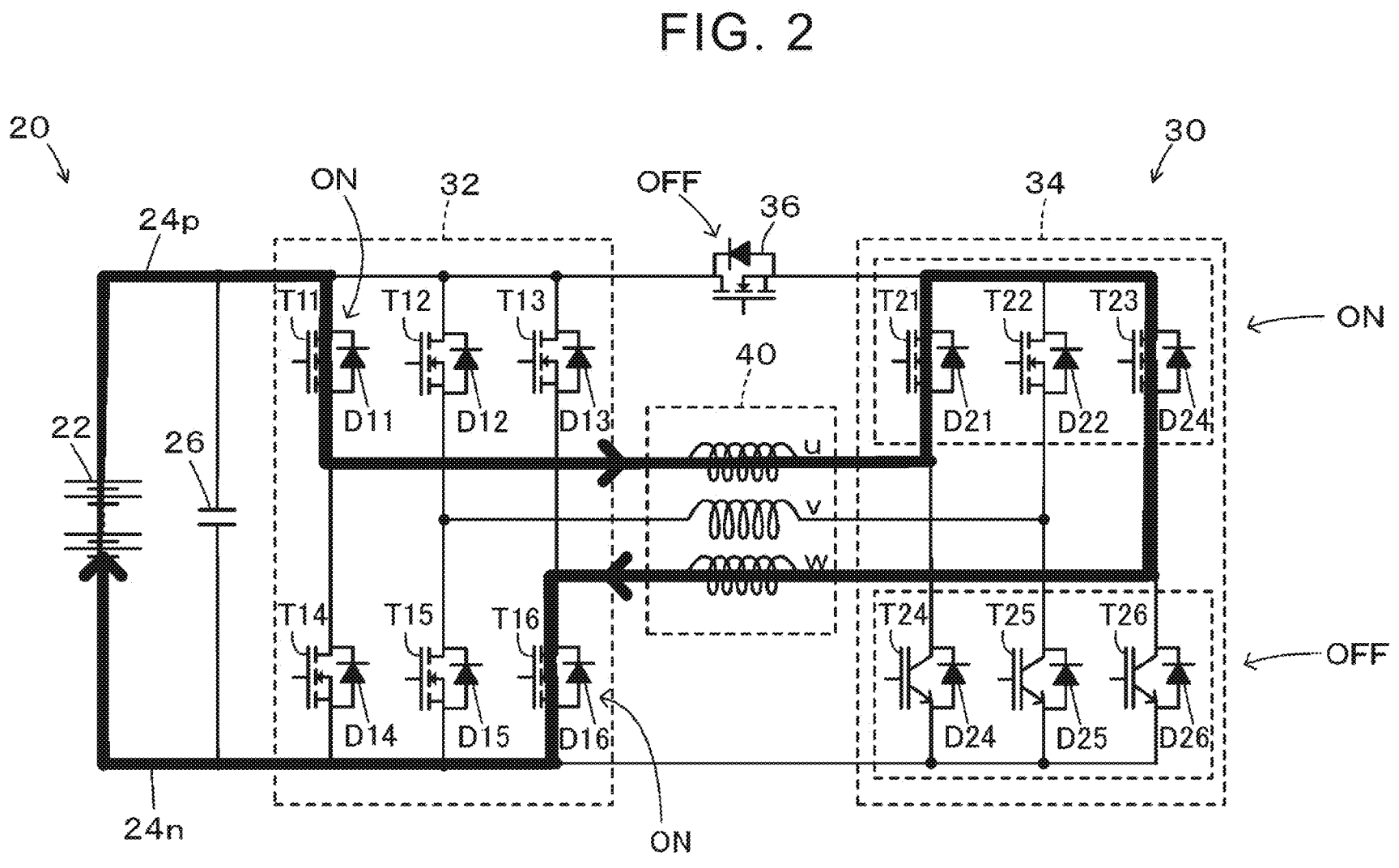

In the power conversion device 30 of the embodiment, T16 is switching controlled from the transistor T11 of the first inverter 32 while the connection switch 36 is turned off, T23 is turned on from the transistor T21 of the upper arm of the second inverter 34, and T26 is turned off from the transistor T24 of the lower arm. As a result, the open winding motor 40 can be driven by star connection. That is, by turning off the connection switch 36 and turning on T23 from the transistor T21 of the upper arm of the second inverter 34, the u-phase, v-phase, and w-phase of the open winding motor 40, from the turned on transistor T21 to the neutral point by T23, the open winding motor 40 is driven by the first inverter 32 as a star connection type motor. FIG. 2 shows a state of a current flowing through the drive device 20 when the transistor T11, T16 is on and the transistor T12, T13, T14, T15 is off, as an example when the open winding motor 40 is driven as a star connection type motor by the first inverter 32. FIG. 2 shows a state where a current flows by a thick solid-line arrow. During the star connection driving, the transistors T21 to T23 of the upper arm of the second inverter 34 are constantly turned on. However, since the transistors T21 to T23 are formed by SiC-MOSFET having the excellent conduction property compared with Si-IGBT, the power loss during the star connection driving can be suppressed as compared with the case where the transistors T21 to T23 are formed by Si-IGBT.

In the power conversion device 30 of the embodiment, T16 is switching controlled from the transistor T11 of the first inverter 32 while the connection switch 36 is turned on, and T26 is switching controlled from the transistor T21 of the second inverter 34. Thus, the open winding motor 40 can be driven by delta connection. At this time, the connection switch 36 is always on-state, but since the connection switch 36 is made of a SiC-MOSFET having excellent conduction properties, it is possible to suppress the power loss during the delta connection driving.

In the power conversion device 30 of the above-described embodiment, T23 of the transistors T21 constituting the upper arm of T16 and the connection switch 36 and the second inverter 34 from the six transistors T11 of the first inverter 32 is made of a SiC-MOSFET having excellent conduction properties. Thus, it is possible to suppress the power loss during the star connection driving and the power loss during the delta-connection driving. Also, Si-IGBT is generally inexpensive to SiC-MOSFET. Therefore, the power conversion device 30 can be made inexpensive as compared with a transistor T24 that forms the lower arm of the second inverter 34 and a transistor T26 that forms SiC-MOSFET.

Figure 3:
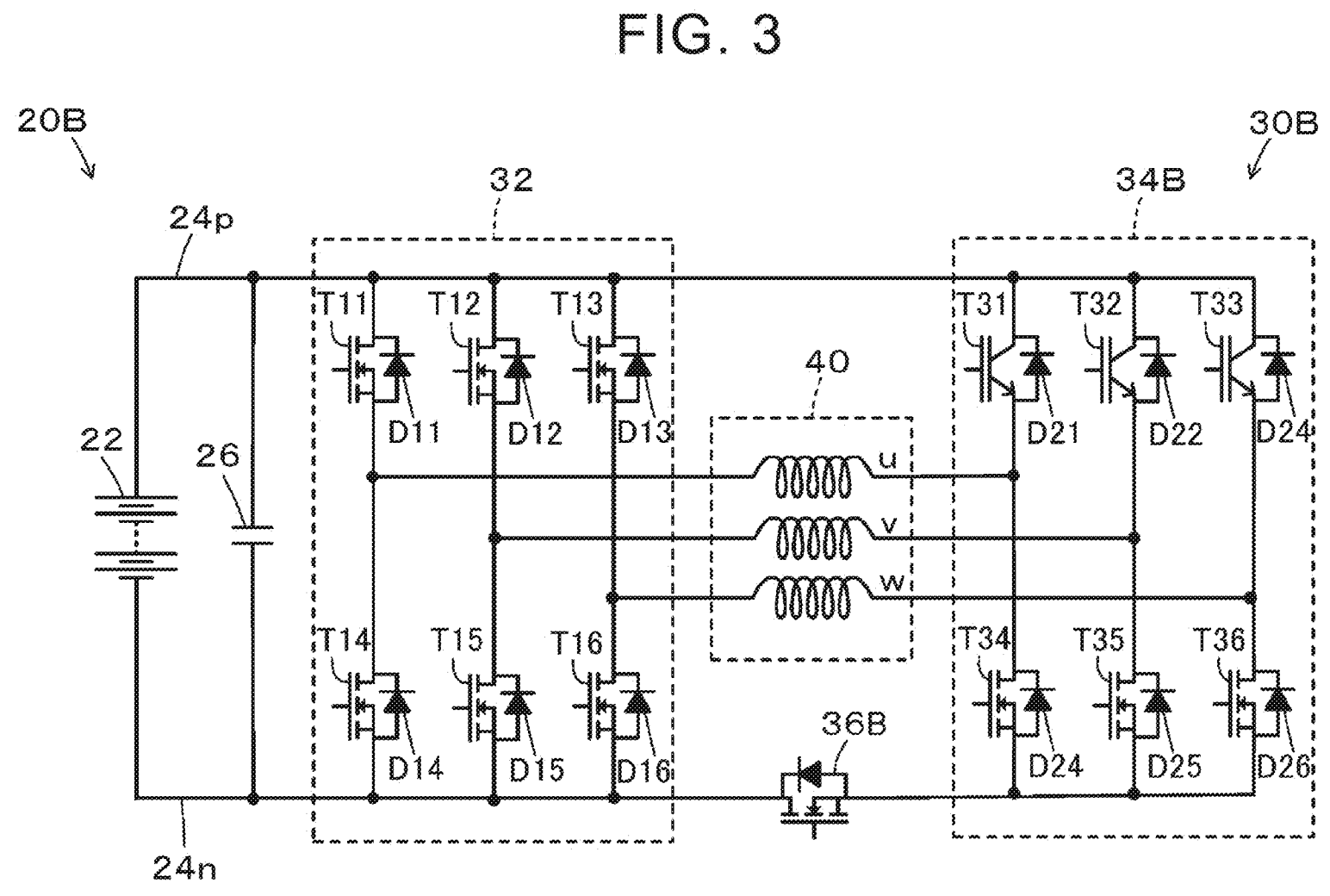

In the power conversion device 30 of the embodiment, T23 is made of a SiC-MOSFET having excellent conduction properties from the transistor T21 constituting the upper arm of the connection switch 36 and the second inverter 34, which are attached to T16 and the positive side power line 24p from the six transistors T11 of the first inverter 32. The transistor T24 constituting the lower arm of the second inverter 34 to T26 is constituted by a Si-IGBT having a conduction property inferior to that of SiC-MOSFET. However, as shown in the power conversion device 30B of the drive device 20B of the modification of FIG. 3, the six transistors T11 to T16 of the first inverter 32, the connection switch 36B attached to the negative side power line 24n, and the transistors T34 to T36 constituting the lower arm of the second inverter 34B may be configured by a SiC-MOSFET having excellent conduction properties. T33 from the transistor T31 constituting the upper arm of the second inverter 34B may be formed of a Si-IGBT having a conduction property inferior to that of SiC-MOSFET. In this case, T16 is switching controlled from the transistor T11 of the first inverter 32 while the connection switch 36B is turned off and T36 is turned on from the transistor T34 of the lower arm of the second inverter 34 and T33 is turned off from the transistor T31 of the upper arm. As a result, the open winding motor 40 can be driven by star connection. In addition, T16 is switching controlled from the transistor T11 of the first inverter 32 while the connection switch 36 is turned on, and T36 is switching controlled from the transistor T31 of the second inverter 34B. Thus, the open winding motor 40 can be driven by delta connection. In the power conversion device 30 of this modification, it is also possible to suppress the power loss during the star connection driving and the power loss during the delta-connection driving.

In the power conversion device 30 of the embodiment, T23 of the transistors T21 constituting the upper arm of T16 and the connection switch 36 and the second inverter 34 from the six transistors T11 of the first inverter 32 is made of SiC-MOSFET having excellent conduction properties. However, as long as it is a semiconductor element having excellent conduction properties, the switching device of the wide bandgap semiconductor may constitute a T23 from T16 and the connection switch 36 from the six transistors T11 of the first inverter 32 and the transistor T21 constituting the upper arm of the second inverter 34. The switching device using a wide bandgap semiconductor may be a switching device using a wide bandgap semiconductor using, for example, gallium nitride (GaN).

The correspondence between the main elements of the embodiments and the main elements of the disclosure described in the column of the means for solving the problem will be described. In the embodiment, the battery 22 corresponds to a "power storage device". The open winding motor 40 corresponds to an "open winding motor". The first inverter 32 corresponds to the "first inverter". The second inverter 34 corresponds to the "second inverter". The connection switch 36 corresponds to a "line-connecting switching device".

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the present disclosure has been described above using the embodiment, the present disclosure is not limited to the embodiment in any way, and may be implemented in various modes without departing from the scope of the present disclosure.

The present disclosure is applicable to a manufacturing industry of a power conversion device and the like.

What is claimed is:

1. A power conversion device connected to a power storage device and an open winding motor with three phases, the power conversion device comprising:
   a first inverter that is connected to a power line connected to the power storage device, and that is also connected to the three phases of the open winding motor;
   a second inverter that is connected to the power line and that is also connected to the three phases of the open winding motor; and
   a line-connecting switching device that is attached to a positive side line of the power line, between the first inverter and the second inverter, wherein:
   three switching devices of an upper arm and three switching devices of a lower arm of the first inverter, three switching devices of an upper arm of the second inverter, and the line-connecting switching device, are made up of a first semiconductor switching device;

three switching devices of a lower arm of the second inverter are made up of a second semiconductor switching device that is different from the first semiconductor switching device; and
   a semiconductor switching device that has higher conduction characteristics as compared to the second semiconductor switching device is used as the first semiconductor switching device in order to suppress power loss, wherein:
      the first semiconductor switching device is a switching device of a wide bandgap semiconductor using gallium nitride (GaN) or silicon carbide (SiC); and
      the second semiconductor switching device is a switching device of a semiconductor using silicon (Si).

2. The power conversion device according to claim 1, wherein:
   the first semiconductor switching device is a SiC metal-oxide-semiconductor field-effect transistor (MOSFET); and
   the second semiconductor switching device is a Si insulated-gate bipolar transistor (IGBT).

3. A power conversion device connected to a power storage device and an open winding motor with three phases, the power conversion device comprising:
   a first inverter that is connected to a power line connected to the power storage device, and that is also connected to the three phases of the open winding motor;
   a second inverter that is connected to the power line and that is also connected to the three phases of the open winding motor; and
   a line-connecting switching device that is attached to a negative side line of the power line, between the first inverter and the second inverter, wherein:
   three switching devices of an upper arm and three switching devices of a lower arm of the first inverter, three switching devices of a lower arm of the second inverter, and the line-connecting switching device, are made up of a first semiconductor switching device;
   three switching devices of an upper arm of the second inverter are made up of a second semiconductor switching device that is different from the first semiconductor switching device; and
   a semiconductor switching device that has higher conduction characteristics as compared to the second semiconductor switching device is used as the first semiconductor switching device in order to suppress power loss, wherein:
      the first semiconductor switching device is a switching device of a wide bandgap semiconductor using gallium nitride (GaN) or silicon carbide (SiC); and
      the second semiconductor switching device is a switching device of a semiconductor using silicon (Si).

4. The power conversion device according to claim 3, wherein:
   the first semiconductor switching device is a SiC metal-oxide-semiconductor field-effect transistor (MOSFET); and
   the second semiconductor switching device is a Si insulated-gate bipolar transistor (IGBT).

* * * * *